(12) United States Patent
Schwekutsch et al.

(10) Patent No.: US 8,490,770 B2
(45) Date of Patent: Jul. 23, 2013

(54) PARKING BRAKE ASSEMBLY WITH EMERGENCY UNLOCKING MECHANISM

(75) Inventors: Michael Schwekutsch, Wermelskirchen (DE); Mark Schmidt, Koenigswinter (DE)

(73) Assignee: GKN Driveline International GmbH, Lohmar (DE)

( * ) Notice: Subject to any disclaimer, the term of this patent is extended or adjusted under 35 U.S.C. 154(b) by 292 days.

(21) Appl. No.: 13/117,225

(22) Filed: May 27, 2011

(65) Prior Publication Data

US 2011/0290615 A1 Dec. 1, 2011

(30) Foreign Application Priority Data

May 27, 2010 (DE) .......................... 10 2010 029 401

(51) Int. Cl.
*B60W 10/18* (2012.01)

(52) U.S. Cl.
USPC ...................................................... 192/219.5

(58) Field of Classification Search
USPC .................. 192/219.5, 219.4; 188/31, 69, 34, 188/196 B
See application file for complete search history.

(56) References Cited

U.S. PATENT DOCUMENTS

| | | | | |
|---|---|---|---|---|
| 3,703,941 A * | 11/1972 | Ohie et al. | ........................ | 188/31 |
| 6,065,581 A * | 5/2000 | Nogle | ........................ | 192/219.5 |
| 6,427,811 B1 * | 8/2002 | Wedge et al. | ................. | 188/162 |
| 6,655,505 B2 * | 12/2003 | Oppitz et al. | ............... | 188/82.77 |
| 7,832,541 B2 * | 11/2010 | Joshi et al. | .................. | 192/219.4 |
| 8,002,101 B2 * | 8/2011 | Joshi et al. | .................. | 192/219.4 |
| 2008/0302627 A1 * | 12/2008 | Kato et al. | .................. | 192/219.5 |
| 2010/0193319 A1 * | 8/2010 | Stutzer et al. | ............... | 192/219.5 |

FOREIGN PATENT DOCUMENTS

WO    WO-2010/139524 A1    12/2010

\* cited by examiner

*Primary Examiner* — David D Le
*Assistant Examiner* — David J Hlavka
(74) *Attorney, Agent, or Firm* — Rader, Fishman & Grauer, PLLC

(57) ABSTRACT

A parking brake assembly for the driveline of a motor vehicle is disclosed. The parking brake assembly comprises a locking mechanism, an actuator and an unlocking mechanism. The locking mechanism is able to inhibit and release the rotational movement of a shaft in the driveline of a motor vehicle. The actuator actuates the locking mechanism. The locking mechanism comprises a locking element which is linearly movable by the actuator, and a latching element which cooperates with the locking element. The locking element can be transferred into a first axial position in which the latching element assumes a releasing position in which the shaft is rotatable, and wherein the locking element can be transferred into a second axial position in which the latching element assumes a closing position in which the latching element inhibits a rotational movement of the shaft. The unlocking mechanism forcibly unlocks the locking mechanism. The unlocking mechanism comprises an unlocking element for rotating the locking element, wherein, in the second axial position, the locking element can be transferred into a first rotational position in which the locking element holds the latching element in the closing position, and wherein the locking element can be transferred into a second rotational position in which the latching element can assume a releasing position.

15 Claims, 4 Drawing Sheets

PARKING BRAKE ASSEMBLY WITH EMERGENCY UNLOCKING MECHANISM

CROSS REFERENCE TO RELATED APPLICATIONS

This application claims benefit of German Application No. 10 2010 029 401.2 filed on May 27, 2010, which application is hereby incorporated by reference in its entirety.

TECHNICAL FIELD

The disclosure relates to a parking brake assembly with an emergency unlocking mechanism for a motor vehicle. Such parking brake assemblies are used for inhibiting an output shaft of a motor vehicle so that the vehicle is prevented from unintentionally rolling away if the engine does not make available any torque. An emergency unlocking mechanism serves to forcibly suspend the locking braking function when, for example, the electronic control unit of the parking brake, or of the vehicle, is not in operation.

BACKGROUND

From document DE 10 2009 023 498 A1 there is known a parking brake assembly with an emergency unlocking mechanism for a motor vehicle with an electrically driven driving axle. The electric drive is used for transmitting torque to the output shaft in order, thus, to reduce the actuating forces necessary for releasing the locking mechanism. The emergency unlocking mechanism comprises a threaded pin which, by being threaded into a housing of the parking brake assembly, is able to axially displace a pressure element for unlocking purposes.

SUMMARY

A parking brake assembly for the driveline of a motor vehicle is provided that comprises a locking mechanism which is able to inhibit and release the rotational movement of a shaft in the driveline of a motor vehicle; an actuator for actuating the locking mechanism; wherein the locking mechanism comprises a locking element which is linearly movable by the actuator, and a latching element which cooperates with the locking element. The locking element is configured to be transferred into a first axial position in which the latching element assumes a releasing position in which the shaft is rotatable, and the locking element is also configured to be transferred into a second axial position in which the latching element assumes a closing position in which the latching element inhibits a rotational movement of the shaft. The parking brake assembly also comprises an unlocking mechanism for forcibly unlocking the locking mechanism. The unlocking mechanism comprises an unlocking element for rotating the locking element, wherein, in the second axial position, the locking element can be transferred into a first rotational position in which the locking element holds the latching element in the closing position, and wherein the locking element is also configured to be transferred into a second rotational position in which the latching element can assume a releasing position.

The disclosed parking brake assembly advantageously allows for easy forcible unlocking of the parking brake. This may be necessary, for example, if there occurs a defect in the vehicle electronics, for instance to be able to tow away the motor vehicle. For forcibly unlocking the brake, merely a rotational movement of the unlocking element, respectively of the locking element is necessary. The locking element can be rotated in its second axial position, i.e. there is no need for an axial displacement of the locking element. In the first rotational position of the locking element, it fixes the latching element in the closing position in which the shaft is prevented from carrying out a rotational movement. By transferring the locking element into the second rotational position, the latching element is able to move away from the shaft, so that the shaft is released. In the case of a braced system, i.e. when the vehicle is positioned on a slope, the latching element can be released from a suitable engageable recess of the shaft by providing a suitable geometry at the returning element or by externally moving the motor vehicle.

In principle, the shaft can be any torque transmitting component which is arranged in the driveline between the drive unit and the wheels of the motor vehicle. The shaft can be an input shaft, an output shaft, a transmission shaft or any other component which transmits torque to the wheels, such as the differential carrier of a differential drive or a component of a brake. In order to subject the wheels of the motor vehicle to a blocking effect, there has to exist a direct torque transmitting connection with the wheels, i.e. there must not be an uncoupled situation between the wheels and the shaft, as a result of which the torque flow is interrupted.

According to one exemplary embodiment, the locking element comprises a recess which extends along a circumferential portion, wherein, in the second rotational position of the locking element, the latching element at least partially engages the recess. The radial depth of the recess is such that the latching element, in the position in which it enters the recess, releases the shaft. For transferring the latching element from the closing position, in which the shaft is inhibited from carrying out a rotational movement, into the releasing position in which the shaft is able to rotate freely, according to an exemplary embodiment, there is provided a spring element which loads the latching element away from the shaft.

The recess extends in the circumferential direction in such a way that the latching element can reliably engage the recess without being tilted or twisted. For this purpose, the length of the recess in the circumferential direction is greater than the axial extension of the latching element, at least in the portion which is intended to enter the recess. More particularly, in one exemplary embodiment, it is proposed that the recess extends along a partial circumferential portion of approximately up to 90° around the axis of rotation of the locking element. The outer face adjoining the recess in the circumferential direction is preferably cylindrical. The cylindrical outer face forms a holding face which, in the first rotational position of the locking element, serves to hold the latching element in the closing position. To that extent, said portion of the locking element which embraces the holding face and the recess, can also be referred to as a holding portion. Axially adjacent to the holding portion, the locking element comprises a functional portion which serves to transfer the latching element from the releasing position into the closing position when the locking element is transferred from the first axial position into the second axial position.

According to an exemplary embodiment, the recess is designed in such a way that the locking element is prevented from carrying out a rotational movement when the latching element engages the recess. In this way, it is ensured that the locking element cannot be rotated into the starting, i.e. into the first rotational position until the locking element has been moved back by the actuator from the second axial position into the first axial position. In the circumferential direction, the recess is delimited by side faces which, preferably, approach one another from the outside to the inside. More particularly, in one exemplary arrangement, the side faces are approximately V-shaped and, according to yet another exemplary embodiment, the side faces extend at least approximately radially towards the axis of rotation of the locking element. Furthermore, the recess comprises a base which, at least largely, is shaped so as to be convex and against which the latching element can come into contact by a corresponding contact face.

In an exemplary embodiment, the unlocking element is held so as to be rotatable relative to a fixed component to which the parking brake assembly is connected. The fixed component can be a drive housing, for example, in which the shaft and the parking brake are arranged. Furthermore, the unlocking element may be held so as to be axially fixed relative to the fixed component, which can be achieved for instance by a securing ring.

According to an exemplary embodiment, the unlocking element is connected to the locking element in a rotationally fixed way. This can be achieved, for example, by out-of-round cross-sectional profiles of the unlocking element and of the locking element. The locking element is axially displaceable relative to the unlocking element. In this way, it is ensured that, for the purpose of the parking brake being activated and deactivated by the actuator, the locking element can be moved between the first and the second axial position without having to change the axial position of the unlocking element. To be able to connect the two elements in a rotationally fixed and axially displaceable way, it is proposed according to an exemplary embodiment, that the unlocking element comprises a connecting portion which is introduced into a bore of the locking element, with the connecting portion and the bore, at least along part of their length, comprising an out-of-round cross-sectional profile.

For actuating the unlocking mechanism, according to an exemplary embodiment, the unlocking element comprises an actuating lever which is connected to the unlocking element in a rotationally fixed way. By rotating the actuating lever, the unlocking element, together with the locking element, are transferred from the first rotational position, in which the latching element is held in the closing position, into the second rotational position in which the recess and the latching element are aligned relative to one another. For rotating the actuating lever, it is possible, for example, to provide a Bowden cable which can be actuated manually if the electronics fail. It goes without saying that instead of the actuating lever with the Bowden cable, it is also possible to provide other means or arrangements for introducing torque into the unlocking mechanism. For example, it is possible to provide an actuating element with an out-of-round end portion or a bolt head with an inner or outer hexagon which is connected to the unlocking mechanism in a rotationally fixed way. If the parking brake is arranged in or at a gearbox, with the fixed component being the transmission housing, it is proposed, more particularly, that the unlocking element is guided through a bore in the housing, with the actuating lever or actuating element being arranged outside the housing so as to be accessible from the outside.

In order to ensure, after the forcible unlocking operation, that the locking element is automatically rotated back into the first rotational position, the locking element is at least indirectly pre-tensioned towards the first rotational position. In this regard, at least indirectly meaning that the locking element or a component connected to the locking element in a rotationally fixed way, more particularly the unlocking element or the actuating lever, is pre-tensioned in the direction of rotation. Such pretension may be achieved by a returning spring which acts on one of said components and exerts a spring force from the second into the first rotational position.

According to an exemplary embodiment, the actuator is designed in such a way that it generates an axial movement for displacing the locking element between the first and the second axial position. For axially moving the locking element, there is provided a spindle drive which can be driven by the actuator and which translates a rotational movement of the actuator into a linear movement of the locking element. The rotational movement is generated by an electric motor which can be controlled by an electronic control unit. However, it is understood that other types of actuators can also be used, for instance an actuator which directly generates a translatory movement for displacing the locking element, such as an actuator which can be operated hydraulically or pneumatically.

According to an exemplary embodiment, the locking mechanism comprises a locking gear which is connected to the shaft in a rotationally fixed way and which cooperates with the latching element. The locking gear can also be referred to as ratchet wheel. By moving the locking element into the second axial position, the latching element can be transferred into a locking position, in which the latching element, at least by a partial portion, is made to approach the shaft. In this locking position, the latching element is connected to the shaft in a form-locking way, so that the shaft is prevented from carrying out a rotational movement. By moving the locking element into the first axial position, the latching element can again assume the releasing position in which the latching element, at least by a partial portion, is arranged so as to be removed from the shaft, so that the shaft is able to rotate freely relative to the latching element.

To transfer the latching element into the releasing position, there is provided, according to an exemplary embodiment, a spring element which loads the latching element away from the ratchet wheel. In one exemplary arrangement, the latching element is provided in the form of a pawl which is supported so as to be pivotable around the pivot axis. The pawl, which can also be referred to as a ratchet pawl, comprises at least one ratchet or tooth which is able to engage circumferentially distributed recesses of the locking gear. Needless to say, a kinematic reversal of shape is also conceivable in that the pawl comprises a recess which can be made to form-lockingly engage circumferentially distributed teeth of the locking gear.

If, when actuating the locking mechanism, the rotational position of the shaft is such that the latching element is positioned opposite an engageable recess of the locking gear, the form-locking engagement of the latching element with the engageable recesses can take place directly, so that the shaft is blocked. In order to ensure secure blocking even if the latching element, when actuating the locking mechanism, is positioned opposite a web between two engageable recesses of the locking gear, there is provided a spring mechanism which is effective between the actuator and the locking element. The spring mechanism pretensions the locking element when the actuator is operated. As soon as a rotational position has been reached, upon continued rotation of the locking gear, in which the rotational position of the latching element and an engageable recess are positioned opposite one another, the locking element is displaced away from the actuator by the pretensioned spring mechanism, with the locking element radially inwardly loading the latching element and with the latching element engaging the opposed engageable recess.

BRIEF DESCRIPTION OF THE DRAWINGS

Exemplary embodiments of the disclosure will be explained below with reference to the drawings wherein:

FIG. 1 shows an exemplary configuration of a parking brake assembly in the open position
 a) in a longitudinal section through the parking brake,
 b) in a side view, partially in section,
 c) in a cross-sectional view through a sectional plane which contains the latching element in a first axial direction of viewing,
 d) in a cross-sectional view through a sectional plane which contains the latching element in a second axial direction of viewing;

FIG. 2 shows the parking brake assembly according to FIG. 1 in a pretensioned position
 a) in a longitudinal section through the parking brake,
 b) in a side view, partially in section,
 c) in a cross-sectional view through a sectional plane which contains the latching element in a first axial direction of viewing,
 d) in a cross-sectional view through a sectional plane which contains the latching element in a second axial direction of viewing;

FIG. 3 shows the parking brake assembly according to FIG. 1 in a closed position
 a) in a longitudinal section through the parking brake,
 b) in a side view, partially in section,
 c) in a cross-sectional view through a sectional plane which contains the latching element in a first axial direction of viewing,
 d) in a cross-sectional view through a sectional plane which contains the latching element in a second axial direction of viewing;

FIG. 4 shows the parking brake assembly according to FIG. 1 in an emergency unlocked position
 a) in a longitudinal section through the parking brake,
 b) in a side view, partially in section,
 c) in a cross-sectional view through a sectional plane which contains the latching element in a first axial direction of viewing,
 d) in a cross-sectional view through a sectional plane which contains the latching element in a second axial direction of viewing.

DETAILED DESCRIPTION

FIGS. 1 to 4 will initially be described jointly below. These figures show a parking brake assembly 2 for a motor vehicle, but of the motor vehicle there can be seen only one stationary component 3, more particularly a part of a transmission housing. The parking brake assembly 2 is arranged at a shaft 4 in a torque flow between a driving unit (not illustrated), for example an internal combustion engine or an electric motor, and a driving axle of the motor vehicle. In addition to the shaft 4, the parking brake assembly 2 comprises a locking mechanism 6 which indirectly acts on the shaft 4.

The locking mechanism 6 serves to optionally inhibit or release a rotational movement of the shaft 4. For actuating the locking mechanism 6, there is provided a linearly acting actuator 7 which, in one exemplary arrangement, is provided in the form of an electro-mechanical actuator and which is controlled by an electronic control unit (not illustrated). However, it goes without saying that the actuator can also be provided in alternative embodiments, for example in the form of a hydraulic or pneumatic actuator. The actuator 7 comprises a driveshaft 8 which rotates around the axis of rotation A when the actuator 7 is operated. The driveshaft 8 acts on a slidable element 9, with there being provided a spindle drive between the driveshaft 8 and the slidable element 9. The spindle drive translates the rotational movement of the driveshaft 8 into a linear displacement movement of the slidable element 9.

The locking mechanism 6 comprises a linearly movable locking element 10 which, via the slidable element 9, is indirectly linearly displaceable by the actuator 7. The locking element 10 is connected to the slidable element 9 in such a way that it is axially movable relative to same to a limited extent. When the actuator 7 is operated, the slidable element 9 is axially moved and, via an intermediate spring element 12, acts on the locking element 10. For the purpose of generating a pretensioning force, the spring element 12 is axially supported on the two said elements 9, 10. For axial supporting purposes, there is provided a continuous collar at the slidable element 9 and a recess with a radial supporting face at an end face of the locking element 10. Furthermore, the slidable element 9 comprises a more particularly pin-shaped portion 13 which is inserted into a corresponding bore 14 of the locking element 10. At its free end, the slidable element 9 comprises a thickened portion 15 which serves as a stop relative to the locking element 10.

The locking element 10 can assume a first axial displacement position in which it is arranged proximate the actuator 7, as well as a second axial displacement position in which it is arranged further remote from the actuator 7. The adjustment of the slidable element 10 for opening and closing the parking brake will be explained in greater detail below.

The locking element 10 comprises a functional face 17 which cooperates with a corresponding counter face 19 of a latching element 16 for the purpose of actuating the parking brake. The locking element 10 and the latching element 16 jointly form the locking mechanism 6. The latching element 16 is provided in the form a pawl which, at one end, is supported so as to be pivotable around a pivot axis B. At its opposite free end, on its outside, the pawl comprises the counter face 19 which can be loaded by the functional face 17 of the locking element 10 and which, on its inside, comprises a blocking tooth 20 or ratchet for fixing the shaft 4. The faces 17, 19 are designed in such a way that a translatory movement of the locking element 10 along the first axis A effects a displacement of the latching element 16 towards the third axis C. More particularly, it is proposed that the functional face 17 of the locking element 10 is shaped so as to be conical, but it goes without saying that it could also be spherical. Relative to a plane which contains the axis of rotation C of the shaft 4 and which extends through the point of contact between the functional face 17 and the counter face 19, the counter face 19 is arranged in an angular way. The locking element 10, in the region adjoining the portion with the functional face 17, comprises a cylindrical portion 42 whose diameter is smaller than the diameter of the guiding and holding portion 46 by means of which the locking element 10 is guided relative to the supporting element 25 and which, respectively, serves to hold the latching element 16. Around the cylindrical portion 42, there is thus formed an annular chamber which the latching element 16 is able to enter in its open position.

The latching element 16 serves, optionally, to fix the shaft 4, so that the driveline is prevented from carrying out a rotational movement, or to release the shaft, so that the components of the driveline are able to rotate freely. For transferring the latching element 16 from the blocked position into the released position, there is provided a spring element 22. The spring element 22 is provided in the form of a leg spring which, by a first leg, is supported on the stationary component 3 and, by a second leg, on the latching element 16.

Furthermore, the parking brake assembly 2 comprises a locking gear 23 or ratchet wheel which is connected to the shaft 4 in a rotationally fixed way. The rotationally fixed connection can be achieved by longitudinal teeth or by splines for example. On an outer circumferential face, the locking gear 23 comprises a plurality of circumferentially distributed engageable recesses 24 which can be engaged in a form-locking way by the latching element 16 by the blocking tooth 20 of same. The latching element 16 can be rotatingly transferred into a blocking position in which it is form-lockingly connected to the locking gear 23, so that the locking gear 23 is prevented from carrying out a rotational movement. In the released position, the latching element 16 is pivoted outwardly relative to the locking gear 23, so that the locking gear 23 and thus the driveline of the motor vehicle are freely rotatable.

Furthermore, the parking brake assembly 2 comprises a supporting element 25 which serves to guide and support the locking element 10. The supporting element 25 is at least indirectly firmly connected to the actuator 7, and in one exemplary arrangement, to the housing 26 of the actuator 7. The connection between the supporting element 25 and the housing 26 is such that the supporting element 25 is secured against an axial displacement and/or rotation relative to the actuator 7. For fixing the supporting element 25, this embodiment is provided with an intermediate sleeve 11 which is firmly connected to the actuator housing 26; and in one exemplary configuration, the intermediate sleeve 11 is produced so as to be integral with the actuator housing 26. The supporting element 25 is arranged on the intermediate sleeve 11 and, in this way, is indirectly firmly connected to the actuator housing 26. The supporting element 25 and the intermediate sleeve 11 are secured relative to one another in several ways, i.e. between the two components, there is formed a force-locking connection in the form of a press fit. Furthermore, at its free end, the intermediate sleeve 11 comprises one or several engagement projections 43 which enters/enter an aperture 45 of the supporting element 25, so that the two components are axially secured relative to one another. For radial security purposes, the outside of the intermediate sleeve 11 can be provided with a projection which is able to enter a corresponding recess of the supporting element 10. In a cross-sectional view, the intermediate sleeve 11 comprises an out-of-round inner profile, so that the slidable element 9 is rotationally secured relative to same. The outer face of the intermediate sleeve 11 is cylindrical in shape.

As is particularly recognizable in the cross-sections according to FIGS. 1c-4c and 1d-4d, the supporting element 25 is sleeve-shaped and comprises an inner supporting face 27 for guiding and supporting the locking element 10. The inside of the supporting face 27 is cylindrical and the contact face 28 of the locking element 10 is cylindrical on its outside, which, thus, ensures simple production and assembly procedures as well as secure guiding conditions.

At its end facing the actuator 7, the supporting element 25 comprises a continuously closed portion which can also be referred to as a sleeve portion 29. In the region adjoining the sleeve portion 29, the supporting element 25 comprises a web portion 30 which, at the end facing the locking gear 23, forms the aperture 45. In a cross-sectional view, the wall of the web portion 30 extends over a circular-arch-shaped portion in excess of 180°, so that, in this region, the locking element 10 is securely guided and supported coaxially relative to the axis A. It goes without saying that the supporting element 25 can also comprise a profile which deviates from a circular cross-section, such as, for example, an angular or oval profile.

Furthermore, the parking brake assembly 2 comprises an unlocking mechanism 31 which serves to forcibly unlock the parking brake assembly 2. Such a forcible unlocking operation may be necessary for example if a defect occurs in the motor vehicle electronics and if it is necessary to release the latching element 16 to allow the motor vehicle to be towed away. The unlocking mechanism 31 comprises an unlocking element 32 which is axially fixed relative to the stationary component 3 and rotatable relative thereto. The unlocking element 32 is pin-shaped and comprises a connecting portion 48 which is inserted into the bore 14 of the locking element 10. Between the unlocking element 32 and the locking element 10 there is provided a clearance fit, so that the locking element 10 is axially displaceable relative to the unlocking element 32. Furthermore, the unlocking element 32 is connected to the locking element 10 in a rotationally fixed way. To achieve this, the bore 14 of the locking element 10, and the connecting portion 48 of the unlocking element 32 inserted into same, each comprise an out-of-round profile. At its free end positioned opposite the locking element 10, the unlocking element 32 comprises an actuating lever 34 by which the unlocking element 32 can be rotated, for example by a Bowden cable. It goes without saying that instead of the Bowden cable it is also conceivable to use other mechanisms for introducing torque into the unlocking element. For example, it is possible to use an actuating element with an out-of-round end portion which is connected to the unlocking element in a rotationally fixed way and which is accessible from the outside, for example a screw. The stationary component 3 comprises a sleeve-shaped bearing region 37 in which the unlocking element 32 is rotatably supported. For sealing the inside of the transmission housing 3, there is provided a sealing ring 35.

To permit forcible unlocking, the locking element 10, in a circumferential portion, comprises a recess 36 which can be entered by the latching element 16 when the locking element 10 is in a rotational position in which the recess 36 faces the latching element 16 and the locking gear 23 respectively. This aspect will be explained in greater detail below in connection with the description of FIGS. 4a to 4d.

The assembly comprising the actuator 7, the supporting element 25, the slidable element 9, the locking element 10 and the unlocking element 32 can be inserted into the stationary component 3 and firmly connected to same. For this purpose, there is provided a flange connection 33 which can be connected by bolts (not illustrated). In the vicinity of the aperture into which the assembly is inserted, the stationary component 3 comprises a first bearing portion 38 in which the supporting element 25 is supported. The first bearing portion 38 is provided in the form of a continuously extending ring which surrounds the sleeve portion 29 of the supporting element 25. For sealing the transmission interior, a sealing ring 29 is effectively inserted between the bearing portion 38 and the sleeve portion 40. Furthermore, the fixed component 3 comprises a second bearing portion 40 for supporting and holding the supporting element 25 relative to the stationary component 3, with the second bearing portion 40 being arranged at the end of the supporting element 25 which is positioned remote from the actuator 7. In this way, the two bearing portions 38, 40, together, ensure that the supporting element 25 is fixed and supported relative to the stationary component 3.

Below, there will follow a more detailed description of the switching process for fixing the driveline by means of the inventive parking brake assembly 2 with reference to FIGS. 1 to 3.

FIGS. 1a to 1d show the deactivated condition of the parking brake assembly 2. The locking element 10 is arranged in the first axial sliding position in which the locking element 10 approaches the actuator 7. In this first position, the end portion of the latching element 16, while being loaded by the spring element 22, enters the annular chamber surrounding the locking element 10. The locking tooth 20 is radially outwardly offset relative to an envelope of the locking gear 23, so that the locking gear 23 is able to rotate freely relative to the latching element 16. In this position, the driveline is enabled for transmitting torque from the engine/motor to the wheels.

When the parking brake assembly 2 is activated in order to prevent the motor vehicle from rolling away from its parked position, the actuator 7 receives a suitable electronic signal from the electronic control unit. Subsequently, in connection with the process of blocking the shaft 4, generally two scenarios are conceivable. If, in the parked condition, the blocking tooth 20 of the latching element 16 and a web 21 of the locking gear 34 positioned between two engageable recesses 24, are positioned opposite one another, the slidable element 9 is moved towards the locking element 10 by actuating the actuator 7, with the spring 12 being axially pretensioned. The locking element 10 moves away from the actuator 7 by a small amount, with the functional face 17 of the locking element 10 sliding down the counter face 19 of the latching element 16, so that the latching element 16 is loaded radially inwardly towards the locking gear 23. The locking element 10 can only be axially moved until the latching element 16 comes into contact with the locking tooth 20 of the locking gear 23. Said position in which the latching element 16 is pretensioned relative to the locking gear 23 and is in contact with the locking tooth 20 is shown in FIGS. 2a to 2d.

If then, while the locking gear 23 continues to be rotated, there is reached a rotational position in which the locking tooth 20 of the latching element 16 and an engageable recess 24 are positioned opposite one another, the locking element 10, which is axially loaded by the spring mechanism 12, continues to be moved away from the actuator 7 along the axis A, and the latching element 16—as a result of the planar contact between the functional face 17 and the counter face 19—is pivoted around the axis B, with the locking tooth 20 being moved radially inwardly towards the locking gear 23, with the locking tooth 20 form-lockingly engaging the opposed recess 24, so that the shaft 4, which is connected to the locking gear 23 in a rotationally fixed way, is prevented from carrying out a rotational movement.

If, while the actuator 7 is actuated, the rotational position of the shaft 4 is such that the locking tooth 20 of the latching element 16 is positioned directly opposite the engageable recess 24, the latching element 16 form-lockingly engages the engageable recess 24 directly. The closed condition defined in this way wherein the latching element 16 form-lockingly engages the locking gear 23 is illustrated in FIGS. 3a to 3d.

Below, there will follow a description of the functioning mode of the unlocking mechanism 31 which serves to forcibly unlock the locking mechanism 6 if the electronic control unit of the parking brake or of the vehicle is out of operation. The starting point is that the locking element 10 is arranged in the forward second axial position and that the locking tooth 20 form-lockingly engages a corresponding engageable recess 24 of the locking gear 23. In this condition, the shaft 4 is prevented from carrying out a rotational movement, as shown in FIGS. 3a to 3d.

Figures 1A, 1B, 1C, 1D:
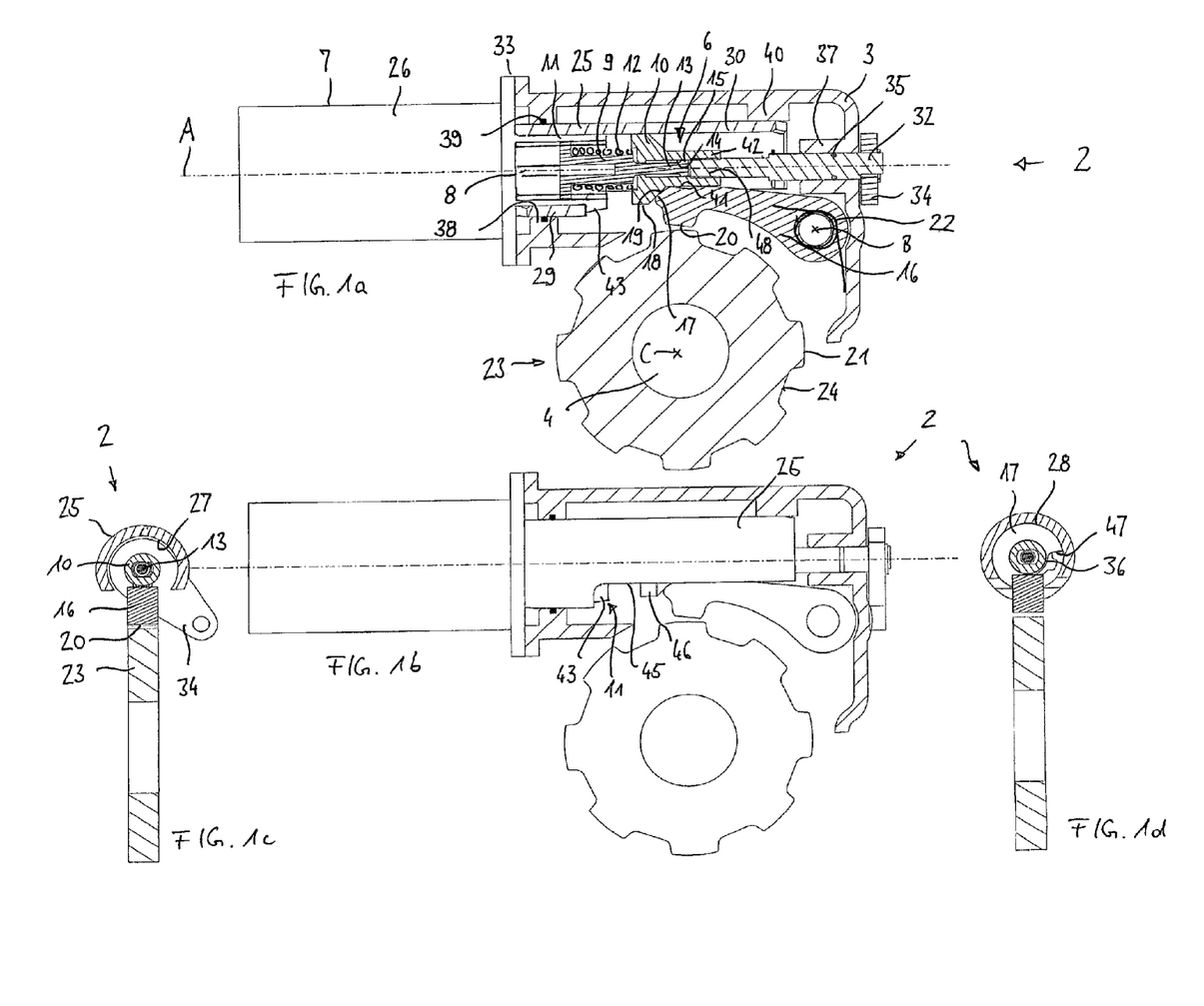
Figures 2A, 2B, 2C:
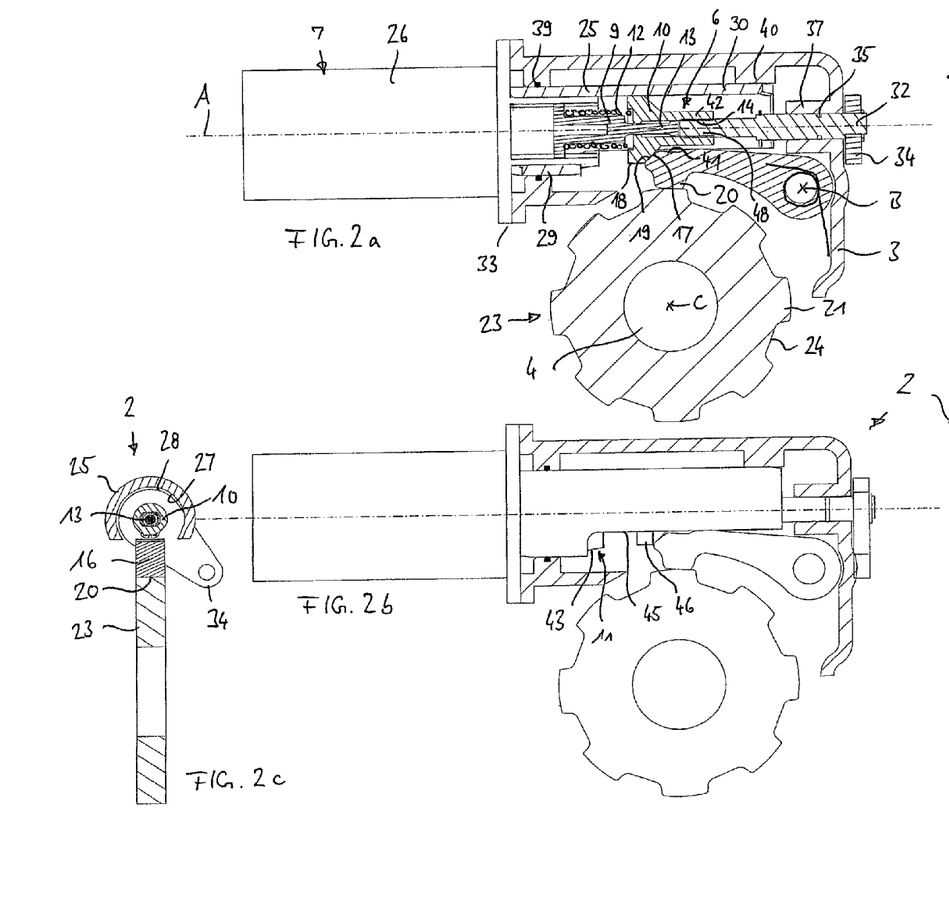
Figure 2D:
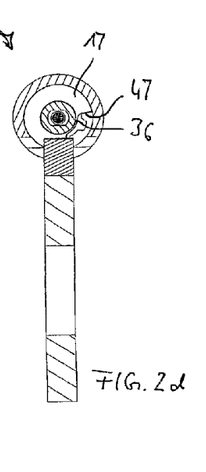
Figure 3A:
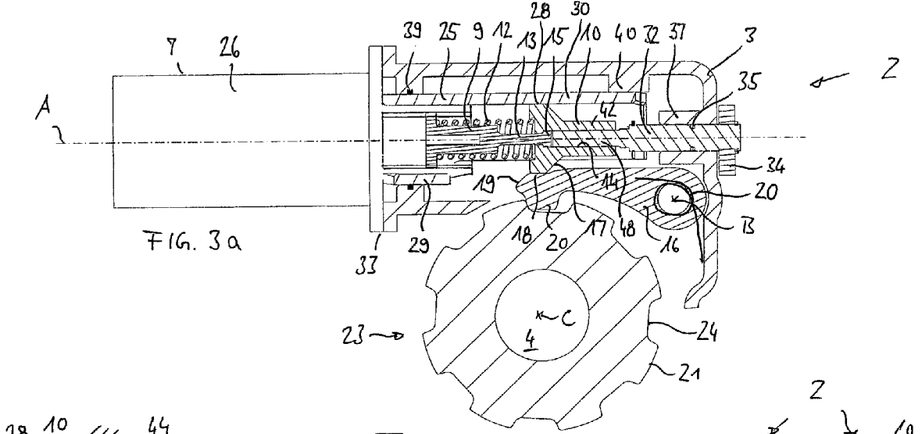
Figures 3B, 3C:
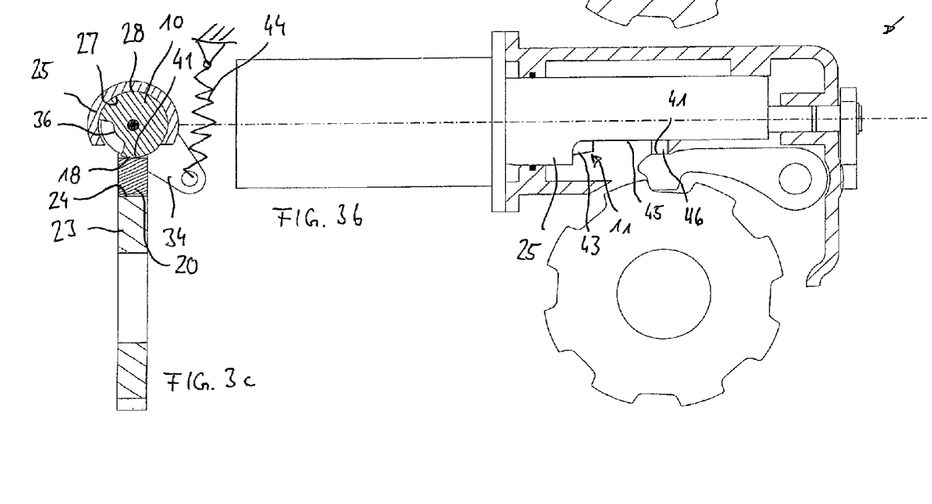
Figure 3D:
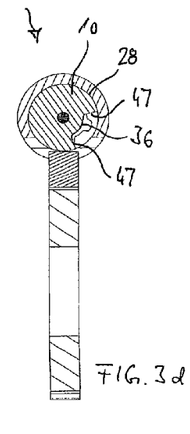
Figures 4A, 4B, 4C, 4D:
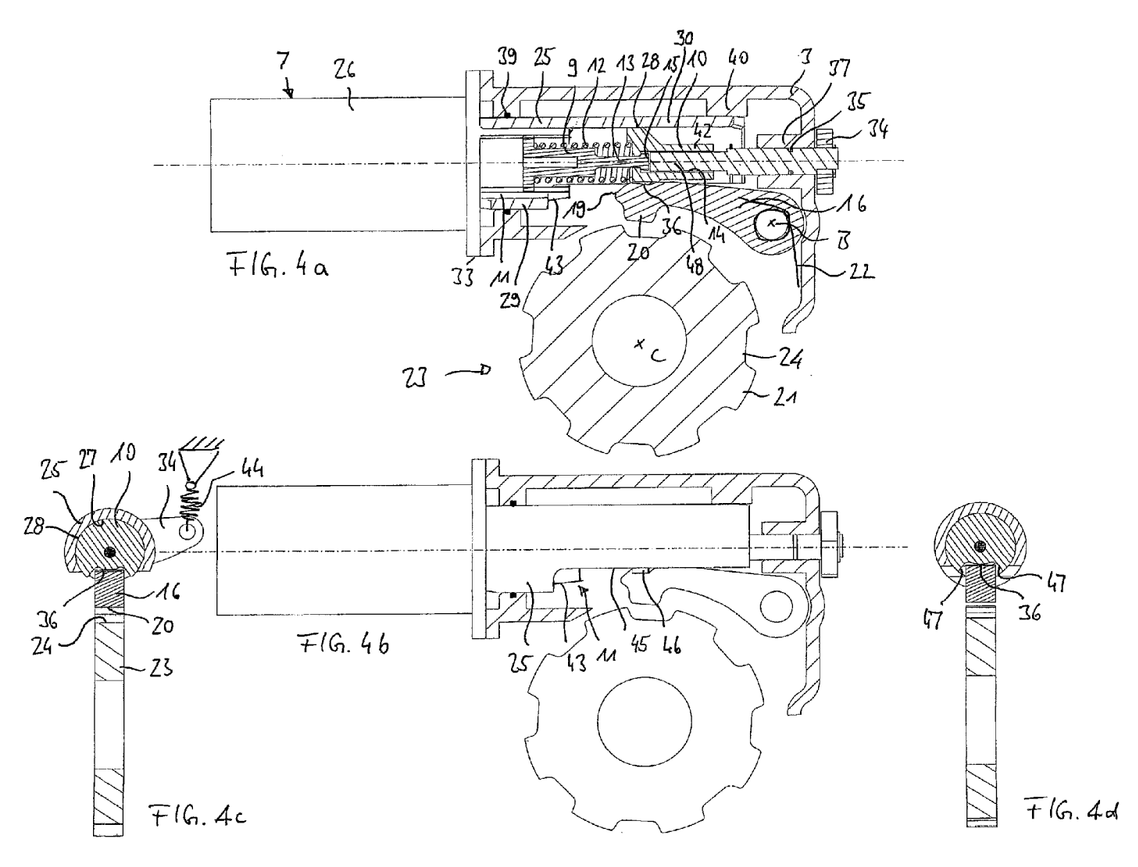

By rotating the actuating lever 34 anticlockwise from the first rotational position, as shown in FIG. 3c, into the second rotational position, as shown in FIG. 4c, the unlocking element 32 is rotated accordingly. This, in turn, results in a rotation of the locking element 10 around the axis A, which locking element 10 is connected in a rotationally fixed way to the unlocking element 32. It is proposed that the unlocking element 32 and the locking element 10 are pretensioned by a returning spring 44 towards the first rotational position. This means that the lever 34 has to be actuated against the spring force of the returning spring 44. For rotating the actuating lever 34, it is possible to use a Bowden cable, for example, which, if the electronics fail, can be actuated manually. It can be seen that the unlocking element 34 is guided through the bearing portion 37 of the housing 3, so that the actuating lever 34 is positioned outside the housing 3.

By rotating the locking element 10 from the first rotational position into the second rotational position, the recess 36 is rotated into a position in which it faces the latching element 16. To allow the latching element 16 to reliably engage the recess 36, the recess 36 extends over a longer distance in the circumferential direction than the thickness of the latching element 16. In the present embodiment, the recess 36 of the locking element 10 extends over approximately 90°. In the second rotational position, in consequence, the latching element 16, which is loaded radially outwardly by the spring element 22, moves into the recess 36 of the locking element 10. The radial depth of the recess 36 is such that the latching element 16, in its outwardly moved position in which it enters the recess 36, releases the shaft 4. In the present illustration, the spring force of the spring element 22 acts clockwise around the axis B on the latching element 16, around which axis the latching element 16 is pivoted accordingly. The forcibly unlocked condition is shown in FIGS. 4a) to 4d). The outer face 28 which adjoins the recess 36 in the circumferential direction is cylindrical in shape and forms the holding and guiding face 46 in order to hold the latching element 16 in the first rotational position of the locking element 10 in the closed position and, respectively, to guide the locking element 10 relative to the supporting element 25.

Furthermore, it is proposed that the locking element 10 is prevented from carrying out a rotational movement as long as the latching element 16 engages the recess 36. For this purpose, the recess 36 comprises side faces 47 which, in the rotational direction, serve as stops for the latching element 16. It can be seen that the side faces are approximately V-shaped and extend approximately radially relative to the axis of rotation A of the locking element 10. The base of the recess 36, which base is contacted by the latching element 16 by a corresponding contact face, is convex in shape. After the actuating lever 34 has been released, the locking element 10, because of the side faces 47 acting as circumferential stops, cannot yet be returned into its original position, i.e. the first rotational position. Only when the system error has been eliminated and the actuator 7 attracts the locking element 10 and displaces same axially relative to the unlocking element 32 into the first axial position, the locking element 10 can be returned into the first rotational position.

For transferring the locking element 10 into the first rotational position, there is provided the returning spring 44 which loads the actuating lever 34 in the direction of rotation. In the starting position, the functional face 17 of the locking element 10 is again positioned in the circumferential region of the latching element 16, so that the parking brake can again be activated when necessary. The returning spring 44 is diagrammatically shown in FIGS. 3c and 4c.

The advantage of the exemplary inventive parking brake assembly 2 is that it can easily be forcibly unlocked. For forcibly unlocking same there is simply required a rotational movement of the unlocking element 32 and of the locking element 10. The locking element 10 can be rotated in its second axial position; i.e. an axial displacement of the locking element 10 is not necessary. After the system error has been overcome, the locking element 10, by being displaced in the first axial position by the actuator 7, can automatically again assume the first rotational position in which the recess 36 is circumferentially offset relative to the latching element 16. In consequence, there is no need for a separate actuating operation to transfer the locking element 10 into its initial rotational position.

What is claimed is:

1. A parking brake assembly for a driveline of a motor vehicle, comprising:
   a locking mechanism configured to inhibit and release the rotational movement of a shaft in the driveline of a motor vehicle;
   an actuator configured for actuating the locking mechanism;
   wherein the locking mechanism comprises a locking element which is linearly movable by the actuator, and a latching element which cooperates with the locking element, wherein the locking element is configured to be transferred into a first axial position in which the latching element assumes a releasing position in which the shaft is rotatable, and wherein the locking element is also configured to be transferred into a second axial position in which the latching element assumes a closing position in which the latching element inhibits a rotational movement of the shaft;
   an unlocking mechanism for forcibly unlocking the locking mechanism, wherein the unlocking mechanism comprises an unlocking element for rotating the locking element, wherein, in the second axial position, the locking element is configured to be transferred into a first rotational position in which the locking element holds the latching element in the closing position, and wherein the locking element is configured to be transferred into a second rotational position in which the latching element assumes a releasing position.

2. A parking brake assembly according to claim 1,
   wherein the locking element comprises a recess which extends along a partial circumferential portion, wherein, in the second rotational position of the locking element, the latching element at least partially engages the recess.

3. A parking brake assembly according to claim 2,
   wherein the recess extends along the partial circumferential portion of approximately up to 90°.

4. A parking brake assembly according to claim 2,
   wherein in a circumferential direction, the recess is delimited by side faces which are arranged at least approximately radially with reference to an axis of rotation (A) of the locking element.

5. A parking brake assembly according to claim 2,
   wherein the recess is designed such that the locking element is prevented from carrying out a rotational movement when the latching element engages the recess.

6. A parking brake assembly according to claim 2,
   wherein the recess comprises a base which is designed so as to be at least largely convex.

7. A parking brake assembly according to claim 1,
   wherein the unlocking element is rotatably held relative to a stationary component to which the parking brake assembly is connected.

8. A parking brake assembly according to claim 1,
   wherein the unlocking element is connected to the locking element in a rotationally fixed way.

9. A parking brake assembly according to claim 1,
   wherein the locking element is at least indirectly pretensioned towards the first rotational position.

10. A parking brake assembly according to claim 1,
    wherein the locking element is axially displaceable relative to the unlocking element.

11. A parking brake assembly according to claim 1,
    wherein the unlocking element comprises a connecting portion which is inserted into a bore of the locking element, wherein, at least over part of their length, the connecting portion and the bore comprise an out-of-round cross-sectional profile.

12. A parking brake assembly according to claim 1,
    wherein the unlocking mechanism comprises an actuating lever which is connected to the unlocking element in a rotationally fixed way.

13. A parking brake assembly according to claim 2,
    wherein a partial circumferential portion which, in a circumferential direction, adjoins the recess, the locking element comprises a cylindrical outer face.

14. A parking brake assembly according to claim 2,
    wherein the locking element comprises a holding portion in which there is arranged the recess and which is configured to hold the latching element in the closing position, as well as a functional portion which is arranged axially adjacent the holding portion and which is configured to transfer the latching element from the releasing position into the closing position.

15. A parking brake assembly according to claim 1,
    wherein between the actuator and the locking element, there are arranged a slidable element and a spring element, wherein the slidable element is axially displaceable relative to the locking element and wherein the spring element axially pretensions the slidable element.

* * * * *